INVENTOR.
GEORGE V. COLBY, JR.
BY
Philip J. McFarland
ATTORNEY

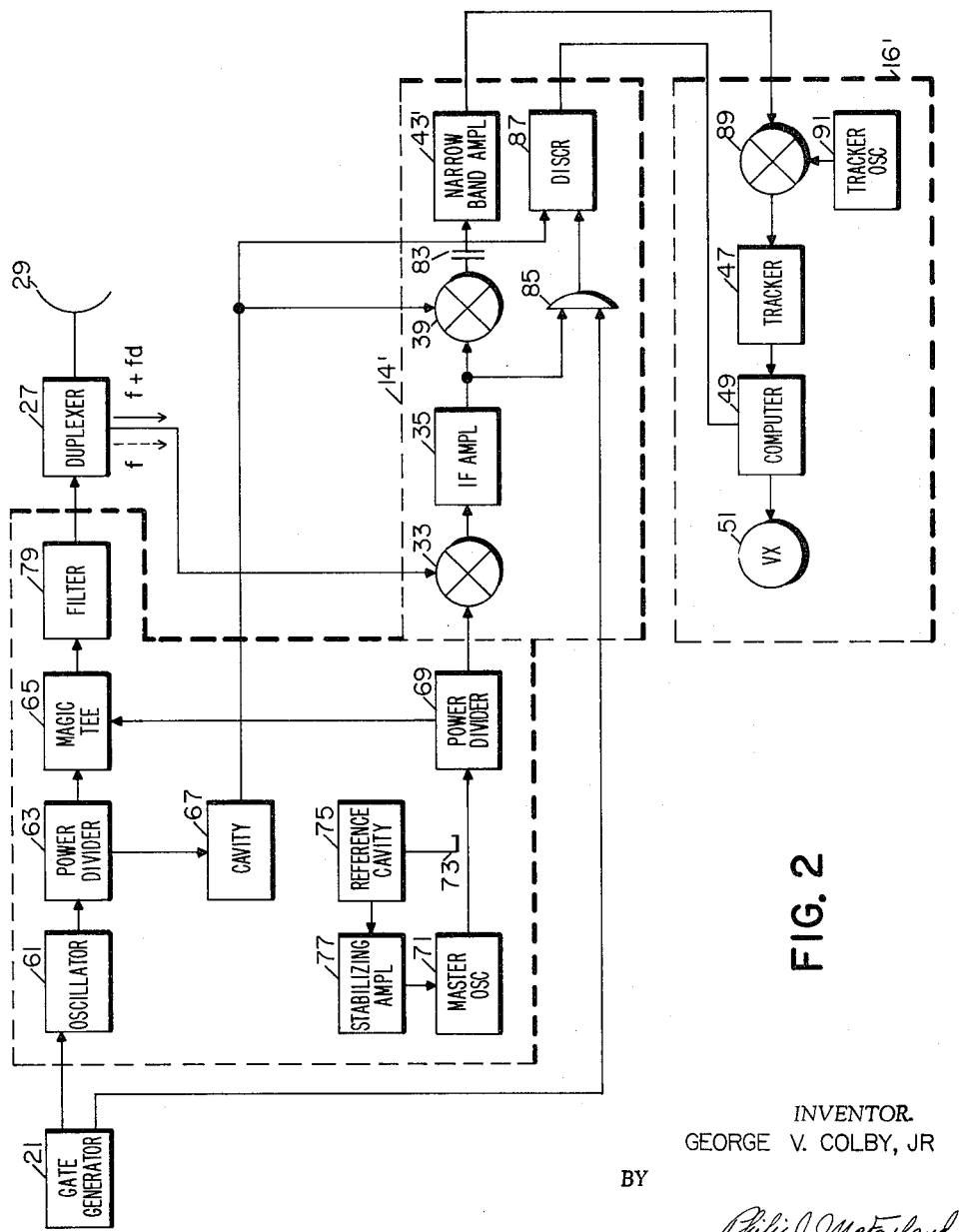

United States Patent Office 3,234,548
Patented Feb. 8, 1966

3,234,548
DOPPLER RADAR SYSTEM
George V. Colby, Jr., Lexington, Mass., assignor to Laboratory for Electronics, Inc., Boston, Mass., a corporation of Delaware
Filed May 16, 1963, Ser. No. 280,949
2 Claims. (Cl. 343—17.1)

This invention pertains generally to radar systems and particularly to airborne radar systems utilizing the Doppler effect.

One of the major problems encountered in the design of any kind of a Doppler radar system has been from the transmitter to the radar receiver or receivers. That is, a portion of the microwave energy cannot, with known components, be prevented from passing directly from the transmitter to the receiver. Typically, such a leakage signal may be 10 to 50 db above receiver noise. The effect of a leakage signal (which is the same as a signal representing zero Doppler shift) of this magnitude may be reduced only with the use of elaborate filtering means. Further, extremely careful design and fabrication procedures must be followed to provide receiver components of adequate dynamic range which are not subject to saturation.

The sources of microwave leakage are known. For example, it is sometimes desirable to provide overlapping transmit-receive times. That is, it is sometimes desirable to turn on the local oscillator of the receiver before the transmitter is turned off. Such "overlap" is required in airborne systems using practical gating means to permit operation of such systems at very low altitudes.

Many attempts have been made to eliminate the leakage problem due to overlap. Perhaps the most obvious approach to the solution of the problem has been to provide faster gating techniques. Thus, gating circuits having rise and fall times in the order of 50 nanoseconds have been used in the expectation that overlap could be eliminated altogether. It has been found, however, that the use of gating circuits having extremely fast rise and fall times often causes a spurious "video" signal (meaning a signal resulting from a characteristic of operation of a receiver) to appear at the output of the receiver mixer. A moment's thought will make it clear that, if the local oscillator is gated on and off extremely rapidly, the envelope of the local oscillator signals will contain many harmonics of the "pulse repetition frequency" (meaning the frequency at which the local oscillator is gated on and off). If one or more of such harmonics falls within the band pass frequency of the intermediate frequency amplifier of the system it may produce a spurious video signal of appreciable magnitude at the output of that amplifier. When the pulse repetition frequency of the local oscillator is coherent with, and a sub-multiple of, the center frequency of the intermediate frequency amplifier, the spurious video signal at the output of the intermediate frequency amplifier may be eliminated by an appropriate filtering circuit. When, however, the PRF is not so related to the center frequency of the intermediate amplifier, it is almost impossible to eliminate the spurious signal.

Another source of leakage between the transmitter and the receiver of known airborne Doppler systems derives from the conventional use of a single antenna for both transmitting and receiving. Known duplexers necessarily incorporated in the microwave circuit to a common transmit/receive antenna do not provide sufficient isolation between the transmitter and the receiver. That is, even the best of known duplexers allow a portion of the energy from the transmitter to leak through to the receiver mixer. It follows then that, so long as the local oscillator is gated on, such a leakage signal would produce the same effect as discussed above with respect to overlap.

Therefore it is an object of this invention to provide an improved airborne Doppler radar system, utilizing a common transmit/receive antenna, in which the effect of leakage from the transmitter to the receiver is minimized.

It is another object of this invention to provide an improved pulsed Doppler radar system which operates independently of the speed at which the gating between the transmitter and receiver is effected.

Another object of this invention is to provide an improved Doppler radar system which accomplishes the objects of this invention and at the same time uses standard known components.

These and other objects of the invention are attained generally in a pulsed Doppler radar system by using a continuously operating first local oscillator which is heterodyned with both the transmitted and received signals to produce a composite signal at a predetermined intermediate frequency. The composite signal is fed through a wide band intermediate frequency amplifier and is then gated by the complement of the transmitter control signal. The wide band intermediate frequency amplifier is arranged to limit only the portion of the composite signal due to leakage from the transmitter, thus reducing the difference in amplitude between the portions of the composite signal and easing the requirements on the speed of operation of the gating means. The gated signal is then processed further to extract the Doppler signal which is fed into a utilization device.

For a more complete understanding of the invention, reference is now made to the following detailed description of a preferred embodiment of the invention and to the accompanying drawing in which:

FIG. 2 is a block diagram of an alternative system according to the invention.

Figure 1:
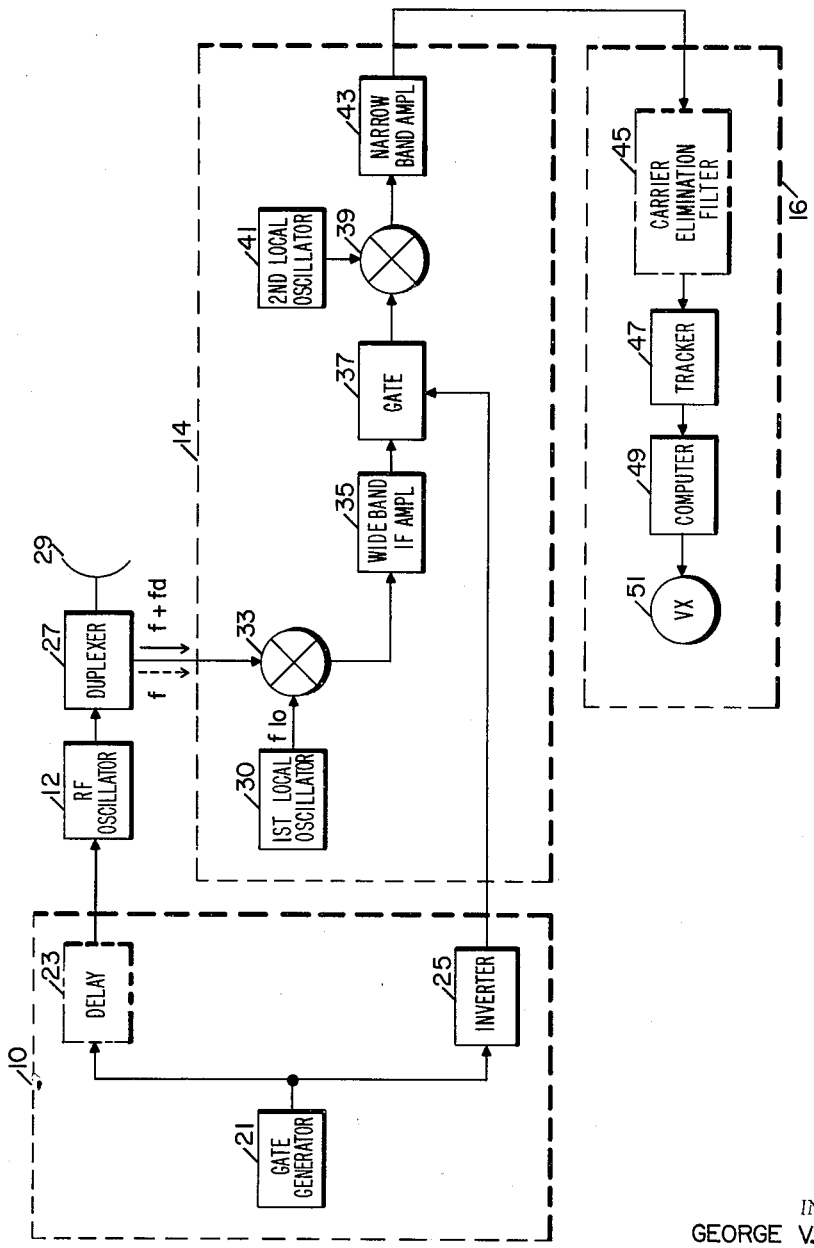
FIG. 1 is a block diagram of a pulsed radar system according to the invention.

Before referring to the drawing in detail, it should be noted that a working system would undoubtedly include at least a second and a third antenna and a corresponding number of receivers. Since, however, the means for switching between antennas and receivers is well known in the art and since such switching means do not constitute an integral part of this invention, the drawing has been simplified to show only a single antenna system. It is felt that a person of ordinary skill would recognize that such omission is merely for the purpose of simplifying the present exposition of the novel features of the invention.

Referring now to FIG. 1, it may be seen that a preferred embodiment of the invention comprises a timing unit 10 which produces control signals according to a predetermined program to synchronize the operation of a radio frequency oscillator 12 and a receiver 14. The output signal of the receiver 14 is then fed into a tracking/computing unit 16, thus finally to produce a signal indicative of the velocity of the vehicle (not shown) which supports the illustrated system.

The timing unit 10, which may be an adaption of the circuit shown and described in U.S. Patent No. 3,005,980 issued October 24, 1961, consists of a gate generator 21 which produces complementary square wave signals. When the system is to be operated in the so-called "interrupted continuous wave mode" (ICW) the duration of the positive and negative portions of the complementary square wave signals from the gate generator 21 are, of course, substantially equal. One of the square wave signals from the gate generator 21 is led to a delay unit 23, which unit preferably is of conventional form, is shown in phantom. This showing indicates that the delay unit 23 is not an absolute necessity for proper operation of the here disclosed system, but rather is provided only when it is desired to overlap the operating periods of the radio frequency oscillator 12 and the receiver 14. The output of the delay unit 23 is fed to the radio frequency oscillator 12, thereby gating the latter unit on and off in a known manner. The output of radio frequency oscillator 12 is fed through a standard duplexer 27 to a beam-forming antenna 29, whence pulses of radio frequency energy are beamed toward a target (not shown).

The receiver 14 includes a continuously operating first local oscillator 31 whose output is heterodyned, in a mixer 33, with the energy reflected from the target back through the beam-forming antenna 29 and passing through a duplexer 27. Such energy here is indicated by an arrow directly below the duplexer 27, which arrow is marked "$f+f_d$." The symbol "$f$" stands for the frequency of the radio frequency energy from the radio frequency oscillator 12 and the symbol "$f_d$" stands for the frequency of the Doppler shift arising out of relative movement between the vehicle supporting the illustrated system and targets intercepted by the energy beamed therefrom. It will be obvious to one having skill in the art that the frequency of the output of the first local oscillator 31 will bear a fixed relation to the frequency of the output of the radio frequency oscillator 12. That is, if the RF oscillator is operating in the $x$-band, say at 9600 megacycles, the frequency of the output of the first local oscillator 31 then will be also in $x$-band, say at 9660 megacycles, if a 60 megacycle intermediate frequency is desired. It will also be obvious to one having skill in the art that the frequency change due to the Doppler effect ($f_d$) will depend upon the type of target intercepted by the beamed energy from the beam-forming antenna 29 and to the relative velocity between the antenna 29 and such target. That is, if the target is an ideal point target, then the frequency $f_d$ will be a single frequency. If, on the other hand, the target is not a perfect point target as when the target actually is a portion of the terrain under an airborne vehicle, then the frequency $f_d$ actually will be a spectrum of frequencies.

It will also be recognized by those having skill in the art that no known duplexer is a perfect switching device for radio frequency energy. In other words during transmit time (when the radio frequency oscillator 12 is gated on) a small portion of the radio frequency energy out of the radio frequency oscillator 12 leaks across the duplexer 27 and passes through the input line to the mixer 33. Such a leakage signal is indicated by the dotted arrow directly below the duplexer 27 and indicated by the symbol "$f$." The problem of leakage is accentuated when the delay unit 23 is incorporated in the timing unit 10, since the radio frequency oscillator 12 is gated on for a portion of the time during which the receiver is enabled to receive energy reflected from a target. It follows then that, since the first local oscillator 31 is continuously operated, there exists on the output line of the mixer 33 a spurious signal resulting from the mixing of the leakage signal "$f$" and the output signal of the first local oscillator 31. Such a spurious signal is, of course, highly undesirable in the ordinary case since it is of such a nature as to make it seem that there is no relative motion between the vehicle carrying the system and the target from which energy is reflected. It has been found, further, that such a spurious signal is very much greater than the desired signal.

The output of the mixer 33 is fed through a wide band intermediate frequency amplifier 35. This latter unit is of conventional construction, being designed so that it amplifies both the spurious signal and the desired signal out of the mixer 33. Its effect on the spurious and desired signals must, however, be different in that the gain characteristics of the wideband I.F. amplifier 35 are such as to limit the spurious signal to some degree. The output of the wide band intermediate frequency amplifier 35 is fed to a gate 37, which latter element is enabled by the output signal of the inverter 25. Consequently, the gate 37 prevents practically all the spurious signal from passing through to a second mixer 39, but allows practically all the desired signal to pass to the last mentioned unit. Only that portion of the spurious signal existing when the gate 37 is enabled is allowed to pass to the second mixer 39. The signal out of the gate 37 is heterodyned in the second mixer 39 with a signal out of a continuously operating second local oscillator 41 and the converted signal is fed through a narrow band amplifier 43 to produce the final output signal of the receiver 14. Such output is, obviously, a relatively low frequency carrier, say 500 kc., shifted by $f_d$. If the delay (which causes overlap) is not used the output signal will be a line (or spectrum) at a frequency of, say 500 kc.$+f_d$. If the delay (and overlap) are used the output will be a line signal at 500 kc. plus a line (or spectrum) signal at 500 kc.$+f_d$. In this case the 500 kc. line is rejected ultimately in the carrier elimination filter 45. The narrow band amplifier 43 incidentally also serves as a filter to reject a good percentage of the noise frequencies generated in the various elements of the receiver as, for example, in the mixer 33 or the wide-band intermediate frequency amplifier 35. The design of the narrow band amplifier may be conventional so long as care is taken to have the center frequency of its pass band equal to the difference frequency between the second local oscillator 41 and the limited portion of the composite signal out of the gate 37. The output signal of the receiver 14 is fed to the tracking/computing unit 16 entering in that unit through a carrier elimination filter 45 when the delay unit 23 is used. That fact is indicated by showing the carrier elimination filter 45 in phantom. The carrier elimination filter 45, if used, preferably is of the type disclosed in U.S. Patent No. 2,909,656. The output of the carrier elimination filter is led through a tracker 47, which element preferably is of the type disclosed in patent application Serial No. 464,697 filed October 26, 1954, now U.S. Patent No. 3,123,769, when it is fed through a computer disclosed in U.S. Patents Nos. 2,910,237 and 2,913,179 finally to produce a D.C. signal whose sense and amplitude is indicative of the relative movement between the vehicle supporting the system and the target intercepted by energy from the beam-forming antenna 29. This latter signal is applied to an indicator 51 as a conventional D.C. voltmeter which preferably has its scale calibrated in terms of velocity, as miles per hour if a visual indication of velocity is desired.

Referring now to FIG. 2, it may be seen that an alternative embodiment of the invention embodying a somewhat different assembly of components from that of FIG. 1 may be used to accomplish the purpose of the invention. The differences between the two embodiments, however, do not change the basic principle of the invention that preferential processing of the desired signal minimizes, or eliminates, the unwanted effect of leakage signals.

Turning now to the details of FIG. 2 it may be seen that the system there illustrated has many elements which are numbered similarly to elements previously described in connection with FIG. 1. Such elements are either identical with the corresponding elements of FIG. 1 or, where primes are used with a number, are obvious modifications of the corresponding element of FIG. 1. Thus, the gate generator 21 produces a first train of gating signals and a second train, complementary to the first train, of gating signals. The first train of gating signals from the gate generator 21 is fed to an oscillator 61 so as to gate that element on and off in accordance with a desired program. The output of the oscillator 61 is fed, through a power divider 63, to a magic tee 65 and to a cavity 67. The oscillator 61 is of conventional construction being designed so as to produce a continuous wave signal, at say 60 megacycles, whenever it is gated on. The cavity 67 also is of conventional construction tuned to resonate at the output frequency of the oscillator 61. The magic tee 65 is also fed by a microwave signal out of a power divider 69. This microwave signal, say at 9600 megacycles, is produced by a continuously operating master oscillator 71 which may be frequency stabilized as shown. That is, a portion of the output of the master oscillator 71 may be picked up by an appropriate probe 73, fed into a reference cavity 75. The signal of the reference may then be detected by conventional means (not shown) to produce a control signal for a stabilizing amplifier 77, which element in turn produces a signal controlling, in any convenient manner, the output frequency of the master oscillator 71. It would be recognized, therefore, that the output of the magic tee 65 is a spectrum of frequencies, including a portion of the output signal of the master oscillator 71 and the beat frequencies resulting from the mixing of that signal and the gated output of the oscillator 61. Such a spectrum is fed, through a band pass filter 79 wherein all but one of the sideband signals in the spectrum out of the magic tee 65 are eliminated, and the signal remaining is fed to a duplexer 27 and thence to a beam-forming antenna 29. It will be noted here, however, that, since the duplexer 27 is not a perfect device and that, since the gate generator 21 is not a perfect device (in that the rise and fall times of its trains of gating signals may be such that the transmitter "on" time may overlap the receiver "on" time), a portion of the signal out of the filter 79 leaks directly into the receiver.

The second portion of the output of the power divider 69 is fed to a mixer 33 along with the signal out of the duplexer 27. The signal out of the duplexer 27 is a composite signal, the first portion, as indicated by the dotted arrow marked "$f$," of such signal being the portion of the output of filter 79 due to leakage across the duplexer 27 and the second portion, as indicated by the solid arrow marked "$f+f_d$," being the signal reflected back from targets and received by the beam forming antenna 29. The output of the mixer 33 then is a composite signal at an intermediate frequency, say 60 megacycles, comprising a portion resulting from the heterodyning of the signal from the master oscillator 71 with the leakage signal through the duplexer 27 and a portion resulting from the heterodying of the signal from the master oscillator 71 with the signal returned from targets. Such composite signal is fed through a wide band intermediate frequency amplifier 35 and thence to a second mixer 39. A portion of the output of the cavity 67, as shown, is also fed into the mixer 39. The portion of the composite signal out of the intermediate frequency amplifier 35 which is due to the beating of the leakage signal and the signal out of the power divider 69 is therefore eliminated from, or converted to a D.C. voltage in, the output of mixer 39. Further the portion of the composite signal out of the intermediate frequency amplifier 35 resulting from the beating of the return signal $f+f_d$ with the output of the power divider 69 in the mixer 33 is converted to a spectrum of low frequency signals. This spectrum of signals is coupled to a capacitor 83 to a narrow band amplifier 43' to produce, from the spectrum of audio frequency signals, a single audio signal, the frequency of which depends upon the Doppler effect on the transmitted pulses. It will be noted, however, that the sense of the Doppler effect is lost in the second mixer 39. That is, whether the vehicle supporting the illustrated system is approaching or receding from the targets may not be determined from the audio signal out of the narrow band amplifier 43'. In order to determine the sense of the Doppler effect, a portion of the signal out of the intermediate frequency amplifier 35 is fed to an and gate 85 which is enabled by the complementary signal out of the gate generator 21. The signal passed through the and gate 85 is compared in a conventional frequency discriminator 87 with the remaining portion of the signal out of the cavity 67, to produce a D.C. signal whose polarity is indicative of the sense of the Doppler effect.

The output of the narrow band amplifier 43' is fed to a tracking/computing unit 16', here shown as comprising a mixer 89 in which the signal out of the narrow band amplifier 43' is used to modulate the signal out of a tracker oscillator 91 so as to produce a convenient signal for the tracker 47. The output of the tracker 47 is fed through the computer 49, which element is also controlled by the output of the frequency discriminator 87, so as finally to produce a signal whose amplitude and polarity together indicate the velocity of the vehicle supporting the illustrated system. Such a signal is displayed on an indicator 51.

A moment's thought will make it clear to those having skill in the art that the elements making up the illustrated embodiments of the invention may be modified in many ways without deviating from the principles of the invention. For example, in the preferred embodiment of the invention it has been shown that a wide band intermediate frequency amplifier which limits only the signal resulting from leakage of the transmitter is desirable. It follows, then, that since there is a difference in amplitude between the portions of the signal out of the wide band intermediate frequency amplifier 35, such a difference may be used to actuate an instantaneous automatic gain control circuit (not shown) for controlling the gain of the intermediate frequency amplifier 35 and or the narrow band amplifier 43 to attenuate any portion of the composite signal resulting from leakage through the duplexer 27 with respect to the desired portion of such signal. Further, it will be recognized that the tracking/computing unit 16' could be replaced by a simple frequency detector and integrator if the beam forming antenna 29 were mounted on a stabilized platform.

With the foregoing explanation of the invention in mind, it may be seen that an improved system according to the invention cannot, because of its nature, suffer from switching problems in the front end of the receiver 14. Further, it may be seen that tedious and exacting design and construction work has been eliminated by using a wide band intermediate frequency amplifier and by gating a heterodyned signal. Still, further, it may be seen that a feature of this invention is that all the elements going to make up the preferred embodiment are standard, well known components, none of which are critical.

In view of the foregoing, therefore, the invention should not be deemed to be limited to the details of what has been described herein by way of example, but rather it should be deemed to be limited only by the scope of the appended claims. What is claimed is:

1. An airborne pulsed Doppler radar system for detecting the relative speed between a vehicle supporting such a system and targets without such vehicle, the system utilizing the same antenna means for transmitting and receiving electromagnetic energy, the level of such energy leaking from the transmitter to the receiver of such system during successive transmitting periods is greater than the level of such energy reflecting back from tragets to the receiver during intervals between such transmitting periods, comprising:
   (a) means for generating pulses of electromagnetic energy in accordance with a predetermined program;
   (b) means, including a duplexer and an antenna, for transmitting the greater portion of each generated pulse of electromagnetic energy toward targets without the vehicle;
   (c) receiver means for producing a signal in accordance with the frequency of the electromagnetic energy reflected back from targets and received by the antenna, the receiver means including:
      (1) heterodying means, including a continuously operating first local oscillator, for converting both the leakage portion of each generated pulse of electromagnetic energy and the electromagnetic energy reflected back from targets to form a composite signal in an intermediate frequency band;

(2) a wide band amplifier arranged to limit only the portion of the composite signal arising from heterodying the leakage portion of each generated pulse of electromagnetic energy and the output signal of the first local oscillator; and, (3) gating means enabled in accordance with the predetermined program to reject substantially all the limited portion of the composite signal and to pass the unlimited portion of the output signal of the wide band amplifier to a utilization device.

2. An airborne pulsed Doppler radar system as in claim 1 wherein the pulses of electromagnetic energy are generated and the gating means is enable during mutually exclusive successive periods of time, the length of each such period being equal.

References Cited by the Examiner
UNITED STATES PATENTS

| | | | |
|---|---|---|---|
| 2,427,523 | 9/1947 | Dolberg | 343—17.1 |
| 2,485,583 | 10/1949 | Ginzton | 343—13 |
| 2,996,708 | 8/1961 | Tollefson | 348—8 |
| 3,024,459 | 3/1962 | Clegg | 343—8 |
| 3,101,470 | 8/1963 | Vosburgh | 343—9 |

OTHER REFERENCES

TM 11–672, Department of the Army Technical Manual, Pulse Techniques, Oct. 1951, page 19.

CHESTER L. JUSTICE, *Primary Examiner.*